(12) United States Patent
Akashi et al.

(10) Patent No.: US 8,201,469 B2
(45) Date of Patent: Jun. 19, 2012

(54) OUTPUT SHAFT REDUCTION-TYPE DUAL CLUTCH TRANSMISSION

(75) Inventors: Kouhei Akashi, Kanagawa (JP); Tadashi Ikeda, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 329 days.

(21) Appl. No.: 12/310,008

(22) PCT Filed: Aug. 1, 2007

(86) PCT No.: PCT/JP2007/065474
§ 371 (c)(1),
(2), (4) Date: Feb. 6, 2009

(87) PCT Pub. No.: WO2008/018477
PCT Pub. Date: Feb. 14, 2008

(65) Prior Publication Data
US 2009/0320629 A1    Dec. 31, 2009

(30) Foreign Application Priority Data

Aug. 8, 2006   (JP) .................................. 2006-215743

(51) Int. Cl.
*F16H 3/08* (2006.01)
(52) U.S. Cl. .......................................... 74/329; 74/330
(58) Field of Classification Search .................... 74/325, 74/329, 330, 333, 340
See application file for complete search history.

(56) References Cited

U.S. PATENT DOCUMENTS

| | | | | |
|---|---|---|---|---|
| 2,174,259 A | * | 9/1939 | Feerick et al. | 74/330 |
| 2,892,355 A | * | 6/1959 | Forster | 74/330 |
| 3,184,984 A | * | 5/1965 | Erdman et al. | 74/333 |
| 6,286,381 B1 | * | 9/2001 | Reed et al. | 74/336 R |
| 6,881,171 B2 | * | 4/2005 | Kuhstrebe et al. | 477/78 |
| 6,909,955 B2 | * | 6/2005 | Vukovich et al. | 701/51 |
| 7,082,850 B2 | * | 8/2006 | Hughes | 74/329 |
| 7,243,565 B2 | | 7/2007 | Soeda | |
| 7,437,963 B2 | * | 10/2008 | Haka et al. | 74/329 |
| 2005/0204840 A1 | | 9/2005 | Soeda | |

FOREIGN PATENT DOCUMENTS

| | | |
|---|---|---|
| JP | 6-46061 | 6/1994 |
| JP | 8-320054 | 12/1996 |
| JP | 2005-265143 | 9/2005 |

* cited by examiner

*Primary Examiner* — Justin Holmes
(74) *Attorney, Agent, or Firm* — McGinn IP Law Group, PLLC

(57) ABSTRACT

A dual clutch transmission having two input shafts respectively connected to clutches, and an intermediate shaft, preventing the intermediate shaft from rotating idle when the vehicle is traveling at high speeds and avoiding excess stirring of lubricating oil in the transmission and increase in noise. In the dual clutch transmission, a direct connection clutch C3 is provided between one input shaft S2 and an output shaft S4, and an intermediate shaft connection clutch C4 for interrupting the transmission of power is provided between the intermediate shaft S3 and the output shaft S4. When the power is directly transmitted from the input shaft S2 to the output shaft S4 via the direct connection clutch C3, the intermediate shaft connection clutch C4 is disconnected to stop the rotation of the intermediate shaft S3 and to prevent the lubricating oil from being excessively stirred by the idle rotation of the intermediate shaft S3. Further, the intermediate shaft connection clutch C4 is disconnected, and a transmission step is constituted by utilizing the gear trains among the two input shafts and the intermediate shaft S3, making it possible to omit one gear train and, therefore, to shorten the length of the transmission.

8 Claims, 5 Drawing Sheets

OUTPUT SHAFT REDUCTION-TYPE DUAL CLUTCH TRANSMISSION

TECHNICAL FIELD

This invention relates to a transmission in a power transmission device of a vehicle. More specifically, the invention relates to a transmission having two clutches and two transmission input shafts connected to the respective clutches, and automatically connects and disconnects these clutches at the time of shifting the transmission steps.

BACKGROUND ART

A variety of kinds of automatic power transmission devices have been developed for the vehicles in order to facilitate the driving of a vehicle and to reduce fatigue to the driver. A representative example may be an automatic transmission comprising a torque converter and a planetary gear mechanism in combination, as is widely used as the power transmission device for the so-called automatic transmission vehicles (AT vehicles). In addition to the automatic transmission, there is a power transmission device by using a transmission of the type of parallel shaft gear mechanism similar to that of a manual transmission vehicle (MT vehicle) in combination with an automatic clutch to shift the transmission steps depending upon the traveling state of the vehicle by using an automatic control device. There is also a power transmission device which shifts the transmission steps responsive to a speed-change instruction from a speed-change lever operated by a driver instead of shifting the transmission steps by using the electronic control device.

A torque converter in the automatic transmission is a transmission device that utilizes a fluid involving, however, a loss of power transmission. Besides, the planetary gear mechanism and a control device, therefore, are complex and expensive. The transmission of the type of parallel shaft gear mechanism involves no transmission loss that stems from the interposition of the torque converter. Therefore, the automatic power transmission device that uses this transmission is superior to the automatic transmission in vehicle fuel efficiency. Besides, the constitution and control of the transmission is simpler and more reliable than those of the automatic transmission.

On the other hand, an automatic speed-changing device that uses the transmission of the type of parallel shaft gear mechanism tends to produce a larger shock of change at the time of shifting the transmission steps than that of the automatic transmission. In the transmission of the type of parallel shaft gear mechanism, a main shaft and a counter shaft arranged in parallel are provided with a plurality of gear trains and a dog clutch, and a speed-changing sleeve of the dog clutch is brought in mesh with one of the gear trains to transmit the engine power to an output shaft. At the time of shifting the transmission step, the speed-changing sleeve that is in mesh is disengaged and is brought into mesh with a new gear train while operating a synchronizer mechanism for attaining synchronism. At this moment, however, the clutch between the engine and the transmission is disconnected, and the transmission of the engine power is interrupted for a short period of time. In the automatic transmission interposing the torque converter, on the other hand, the transmission of power is not substantially interrupted even at the time of shifting the transmission step; i.e., the speed can be smoothly changed with little shock of change.

Concerning the transmission of the type of parallel shaft gear mechanism, there has been known a so-called dual clutch transmission (or a twin clutch transmission) equipped with two clutches and two transmission input shafts connected to the respective clutches in order to continuously transmit the power even at the time of changing the speed while preventing shock as disclosed in, for example, JP-A-8-320054. In the dual clutch transmission as shown in FIG. 5, there are arranged a first input shaft S1 and a second input shaft S2 of a double tubular structure, the second input shaft S2 extending rearward penetrating through the hollow first input shaft S1. A first clutch C1 and a second clutch C2 are provided on the inside and on the outer circumferential side being arranged in concentric in front of the transmission, the clutches being connected on the input side thereof to the engine output shaft. The clutches in this example are wet multi-plate clutches, the output shaft of the first clutch being integrally connected to the hollow first input shaft S1, and the output shaft of the second clutch C2 being integrally connected to the second input shaft S2. Instead of being arranged in concentric, the two clutches may be arranged in parallel in the axial direction. Further, the clutches may be dry single-plate clutches instead of the wet multi-plate clutches.

In the dual clutch transmission, an intermediate shaft (counter shaft) S3 is disposed in parallel with the first input shaft S1 and the second input shaft S2, and an output shaft S4 of the transmission is arranged at the back of the transmission being connected to a propeller shaft of the vehicle. A gear fixed to the rear end of the intermediate shaft S3 comes in mesh with a gear fixed to the output shaft S4 to form an output shaft reduction gear train RG. At the time of changing the speed, the engine power from the first input shaft S1 or the second input shaft S2 is transmitted to the output shaft S4 through the intermediate shaft S3. Through the output shaft reduction gear train RG, the rotational speed of the output shaft S4 becomes lower than the rotational speed of the intermediate shaft S3. Therefore, the transmission is of the so-called output reduction type.

To change the speed, many gear trains having different reduction ratios are arranged among the first input shaft S1, the second input shaft S2 and the intermediate shaft S3. The transmission of this example includes six forward speeds and a reverse gear. The hollow first input shaft S1 has, being fixed thereto, the gears of a second speed gear train G2, a fourth speed gear grain G4 and a sixth speed gear train G6, which are even speeds, while the second input shaft S2 has, being fixed thereto, the gears of a first speed gear train G1 and a third speed gear train G3, which are odd speeds, as well as a reverse gear train GRV. These fixed gears are in mesh with their corresponding loosely fitted gears that are loosely fitted, i.e. rotatably fitted to the intermediate shaft S3. Thus, the gear trains of every other transmission steps are arranged on the input shafts of the dual clutch transmission.

At the rear end of the second input shaft S2, a direct connection clutch C3 of the type of dog clutch is arranged being directly connected to the output shaft S4 to constitute a fifth speed of the transmission. Therefore, the sixth speed constitutes a so-called overtop transmission step of which the output shaft runs faster than the input shaft. The gears loosely fitted to the intermediate shaft S3 have dog teeth (gear splines) formed integrally therewith. On the intermediate shaft S3 are, further, arranged a second speed/fourth speed shifting device X1, a sixth speed/third speed shifting device X2 and a first speed/reverse gear shifting device X3. These shifting devices are constituted as dog clutches as shown in FIG. 3 being provided with a speed-changing sleeve and a synchronizer mechanism as usually used in the transmission of the type of parallel shaft gear mechanism.

In this dual clutch transmission, if the vehicle is traveling at, for example, the second speed, the first clutch C1 is connected, the second clutch C2 is disconnected, the second speed/fourth speed shifting device X1 is in mesh with the second speed gear train G2, and other shifting devices are at their neutral positions. The engine power drives the intermediate shaft S3 through the first input shaft S1 connected to the first clutch C1 and through the second speed gear train G2 and, further, drives the output shaft S4 through the output shaft reduction gear train RG at the rear end. To shift the second speed to the third speed, the first clutch C1 is disconnected, the second speed/fourth speed shifting device X1 is brought to out of mesh and is maintained in a neutral state, the sixth speed/third speed shifting device X2 is brought in mesh with the third speed gear train G3, and the second clutch C2 is connected. After the speed has been shifted, the engine power is transmitted from the second input shaft S2 to the intermediate shaft S3 through the third speed gear train G3, and drives the output shaft S4 through the output shaft reduction gear train RG.

The dual clutch transmission includes the first input shaft S1 and the second input shaft S2 that are arranged being connected to the clutches, respectively, and these input shafts are rotatable independently from each other. At the time of shifting the second speed to the third speed, therefore, it is made possible to bring the sixth speed/third speed shifting device X2 into mesh with the third speed gear train G3 prior to disconnecting the first clutch C1 or prior to bringing the second speed/fourth speed shifting device X1 into out of mesh. Thus, the transmission step can be shifted without substantially interrupting the transmission of the engine power and, therefore, the speed can be changed without shock of change if the second clutch C2 is connected while disconnecting the first clutch C1 after the sixth speed/third speed shifting device X2 has been brought in mesh with the transmission step of the third speed in advance. Further, when the shifting device is to be brought in mesh with the third speed gear train G3, the synchronizer mechanism is operated. Here, however, since an ample surplus time is available for the synchronism, load such as frictional force acting on the synchronizer mechanism can be decreased as compared to that of the synchronizer mechanism in an ordinary transmission of the type of parallel shaft gear mechanism.

If the dual clutch transmission is constituted in the output reduction type, the speed of the output shaft is reduced by the output shaft reduction gear train at the rear end of the intermediate shaft and an increased torque is transmitted. Therefore, the shaft torque of the intermediate shaft can be decreased, the diameter of the shaft and the thickness of the gears (length in the axial direction) can be decreased making it possible to realize the transmission which is light in weight and compact in size. However, the intermediate shaft rotates at a rotational speed higher than that of the output shaft at all times. When the vehicle is traveling at a high speed in which the output shaft rotates at a high speed, therefore, the intermediate shaft rotates at a considerably high speed. A lubricating oil is fed in the housing of the transmission, and the intermediate shaft and gears of the transmission rotate in a state of being dipped in the lubricating oil stored in the bottom portion of the housing; i.e., the lubricating oil is stirred and splashed onto the internal parts of the transmission. Therefore, if the intermediate shaft rotates at high speeds, the lubricating oil is vigorously stirred, the temperature of the lubricating oil rises, the fluid resistance acting on the intermediate shaft increases accompanying the stirring of the lubricating oil, resulting in an increase in the loss of power transmission in the transmission.

The assignment of the present invention is to solve the above problem by preventing the intermediate shaft of the dual clutch transmission from rotating at high speeds when the vehicle is traveling at high speeds.

DISCLOSURE OF THE INVENTION

In view of the above assignment, the present invention deals with a dual clutch transmission equipped with two input shafts, in which a clutch is provided to disconnect the connection between the intermediate shaft and the output shaft in order not to rotate the intermediate shaft when using the so-called direct connection gear. Namely, as described in claim 1, the present invention is concerned with:

"a transmission comprising a first input shaft and a second input shaft connected to clutches, respectively, an intermediate shaft arranged in parallel with the first input shaft and the second input shaft, and an output shaft; wherein a plurality of gear trains for constituting transmission steps are provided among the first input shaft, the second input shaft and the intermediate shaft, the gear trains provided on the first input shaft and the gear trains provided on the second input shaft constituting every other transmission steps;

an output shaft reduction gear train is provided at an end of the intermediate shaft to transmit the power to the output shaft at a reduced speed, and a direct connection clutch is provided between the second input shaft and the output shaft to disconnect the transmission of power; and an intermediate shaft connection clutch is provided for the output shaft reduction gear train to disconnect the transmission of power, the intermediate shaft connection clutch being disconnected when the direct connection clutch is connected."

In the dual clutch transmission of the present invention, the intermediate shaft connection clutch is provided for the output shaft reduction gear train that is provided at the end of the intermediate shaft and connects the intermediate shaft to the output shaft in a reduced manner, the intermediate shaft connection clutch being for disconnecting the connection between the intermediate shaft and the output shaft. The intermediate shaft connection clutch is disconnected when the direct connection clutch connects the second input shaft to the output shaft. That is, when the direct connection clutch is connected and the power is directly transmitted from the second input shaft to the output shaft without passing through the intermediate shaft such as when the vehicle is traveling at a high speed, the intermediate shaft stops rotating; i.e., the intermediate shaft does not rotate idle at an increased speed by being driven by the output shaft. Therefore, the lubricating oil is prevented from being vigorously stirred making it possible to prevent an increase in the temperature thereof and an increase in the transmission loss of the transmission and, besides, to prevent noise that generates when the intermediate shaft rotates at high speeds.

In particular, the dual clutch transmission has two input shafts of a double tubular structure, and the gear trains of odd speeds and even speeds are arranged in series on these input shafts. Therefore, the structure tends to become complex and the intermediate shaft becomes long, further, arousing problems such as excess stirring of the lubricating oil due to idle rotation of the intermediate shaft at high speeds and loss of power transmission and the like. In the power transmission systems of vehicles, further, it is a general practice to so design the final reduction gear that the directly coupled gear is most frequently used to directly transmit the power from the input shaft to the output shaft from the standpoint of reducing the load exerted on the gears and bearings of the transmission. Therefore, the present invention is very highly practicable preventing the intermediate shaft from rotating idle when the direct connection gear is used.

Here, if the intermediate shaft connection clutch is disconnected, the intermediate shaft is separated away from the output shaft. Therefore, it is made possible to transmit the power from the first input shaft to the second input shaft by utilizing the intermediate shaft, and to transmit the power from the second input shaft to the output shaft through the direct connection clutch. Thus, the power is transmitted by suitably selecting a plurality of gear trains arranged among the intermediate shaft and the two input shafts, to establish a transmission step set to a desired transmission gear ratio. This makes it possible to omit one of the gear trains that constitute the transmission steps and to shorten the length of the transmission in the axial direction as compared to the conventional dual clutch transmission in which the gear trains are arranged in series in the axial direction in a number corresponding to the number of the speeds of the transmission. Besides, the distance is shortened between the bearings accompanying the shortened lengths of the input shafts and the intermediate shaft, so that the flexural rigidity of the shafts increases.

As described in claim 2, the intermediate connection clutch may be a dog clutch provided with a synchronizer mechanism. The direct connection clutch which connects the second input shaft to the output shaft and the intermediate connection clutch provided for the output shaft reduction gear train may be friction clutches such as wet multi-plate clutches. When dog clutches provided with the synchronizer mechanism are used, however, the power can be smoothly transmitted and reliably disconnected and, besides, the operation device can be simply constituted.

As described in claim 3, further, the first input shaft is hollow, the second input shaft extends passing through the hollow portion of the first input shaft, and the output shaft is arranged in concentric with the first input shaft and the second input shaft. Upon employing the above constitution, the dual clutch transmission is constructed in a compact size and, particularly, the size can be decreased in the direction of width. In this case as described in claim 4, the clutch connected to the first input shaft is arranged along the outer circumferential portion of the clutch connected to the second input shaft in concentric therewith, making it possible to realize the structure in a compact size inclusive of the clutches of the respective input shafts.

BEST MODE FOR CARRYING OUT THE INVENTION

Figure 1:
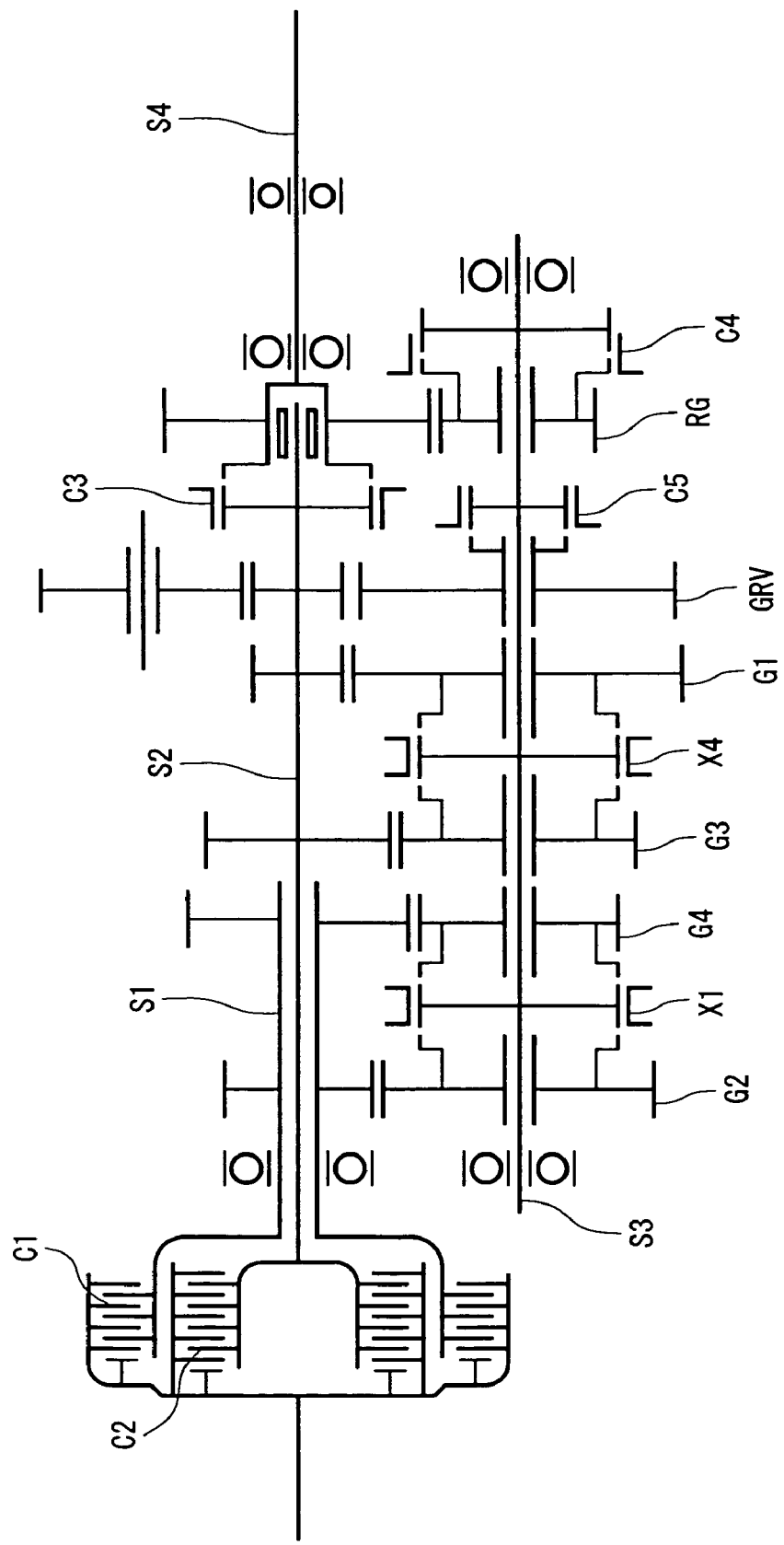
FIG. 1 is a view schematically illustrating the whole dual clutch transmission of the present invention.
Figure 2:
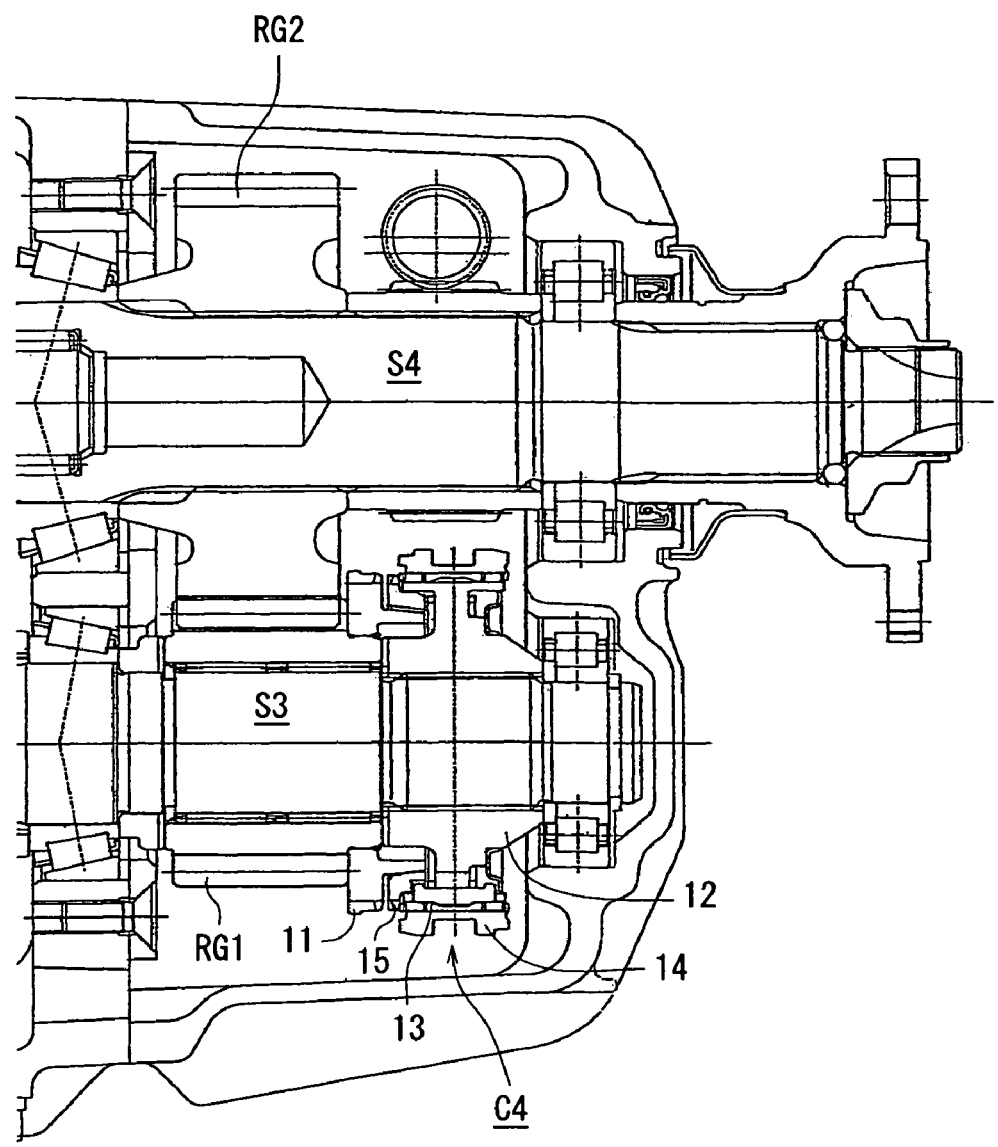
FIG. 2 is a view illustrating, in detail, the vicinities of an output shaft reduction gear train in the dual clutch transmission of the present invention.
Figure 3:
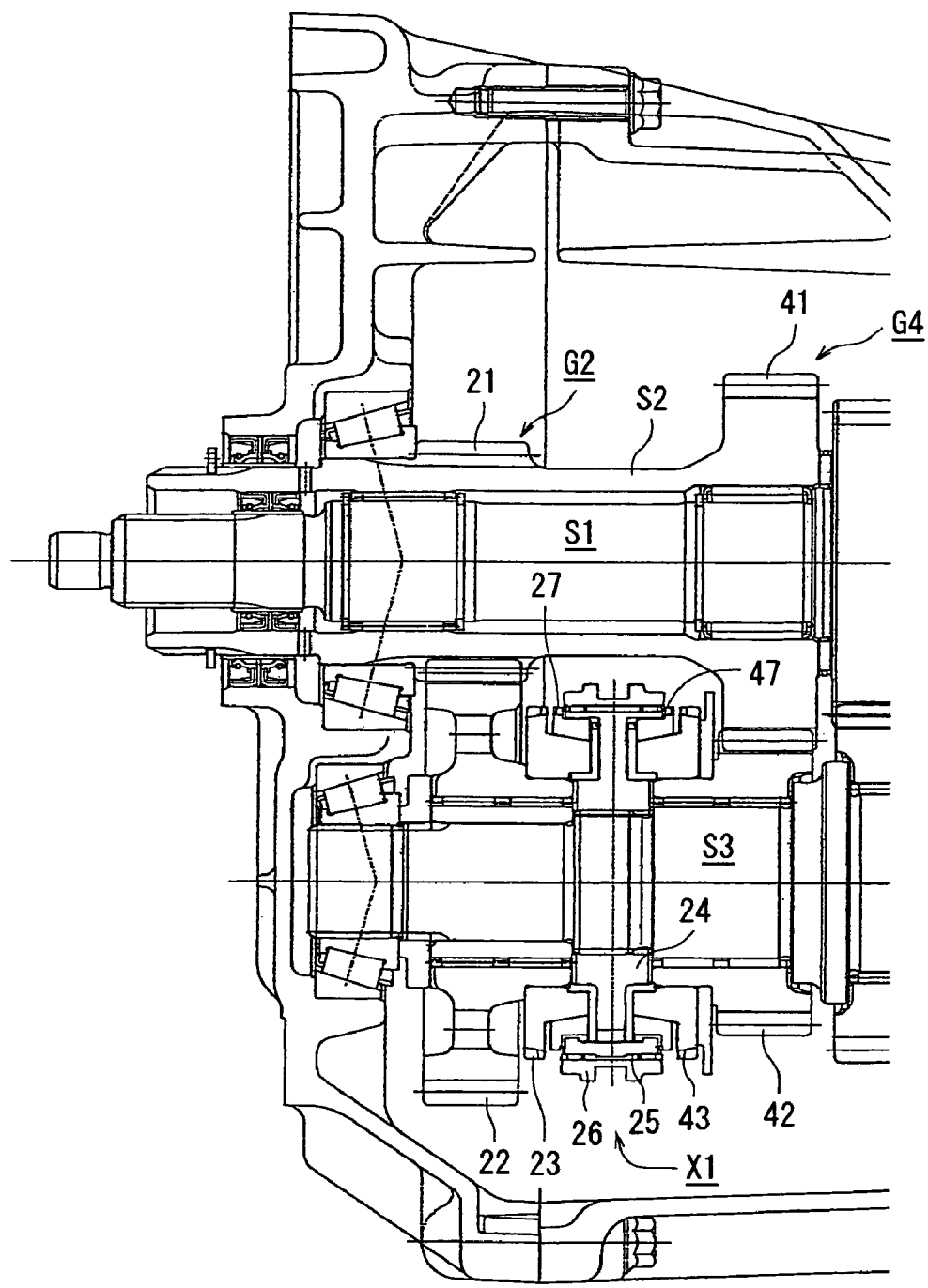
FIG. 3 is a view illustrating a transmission step shifting device in detail.
Figure 5:
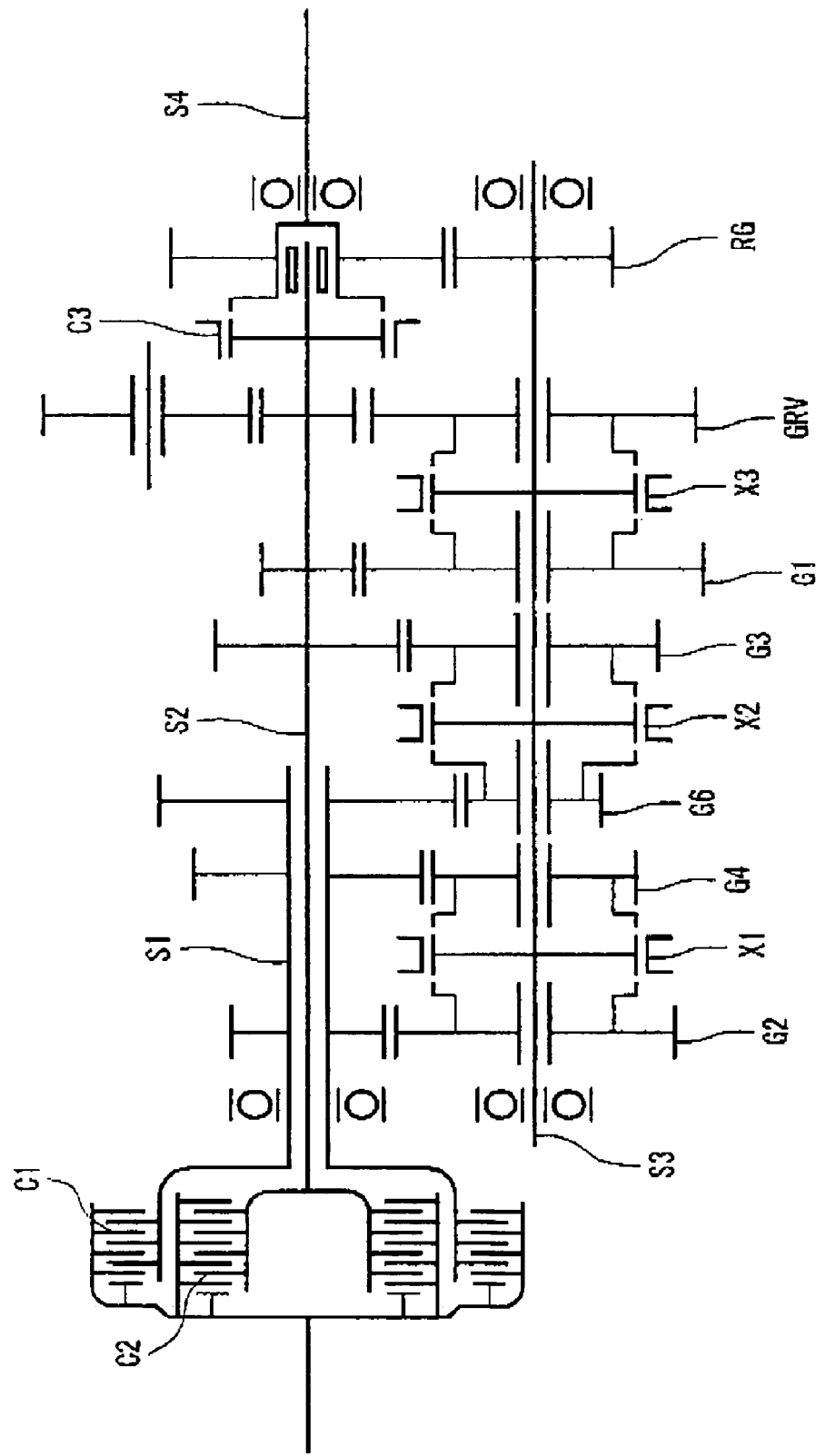
FIG. 5 is a view schematically illustrating the whole dual clutch transmission of a prior art.

The dual clutch transmission of the invention will now be described with reference to the drawings. FIG. 1 is a view schematically illustrating the whole dual clutch transmission of the present invention, FIG. 2 is a view illustrating, in detail, the vicinities of an output shaft reduction gear train on which the intermediate shaft connection clutch of the invention is placed, and FIG. 3 is a view illustrating a transmission step shifting device. In these drawings, the parts corresponding to those of the conventional dual clutch transmission shown in FIG. 5 are denoted by the same reference numerals.

The basic structure and operation of the dual clutch transmission of the present invention are the same as those of the conventional dual clutch transmission of the output reduction type described with reference to FIG. 5. That is, as shown in FIG. 1, the dual clutch transmission has a first clutch C1 and a second clutch C2 arranged in concentric, the first clutch C1 being connected to the hollow first input shaft S1, and the second clutch C2 being connected to the second input shaft S2 that extends rearward penetrating through the first input shaft S1. An intermediate shaft S3 is arranged in parallel with the two input shafts, and an output shaft S4 of the transmission is arranged at the back of the transmission being continuous to the propeller shaft of a vehicle. Among the first input shaft S1, the second input shaft S2 and the intermediate shaft S3, there are arranged a plurality of gear trains having different reduction ratios for changing the speed. A direct connection clutch C3 that directly connects to the output shaft S4 is provided at the rear end of the second input shaft S2. At the rear end of the intermediate shaft S3, an output reduction gear train RG is placed to transmit the power from the intermediate shaft S3 to the output shaft S4 while reducing the speed.

In the dual clutch transmission of the present invention, an intermediate shaft connection clutch C4 is provided for the output shaft reduction gear train RG that is provided at the rear end of the intermediate shaft S3 to connect the intermediate shaft S3 and the output shaft S4 together in a manner of being allowed to be disconnected. The intermediate shaft connection clutch C4 will now be described with reference to FIG. 2.

A small gear RG1 in the output shaft reduction gear train is loosely fitted to the intermediate gear S3, and is in mesh with a large gear RG2 that is fixed to the output shaft S4 by spline-fitting. A member forming dog teeth (gear spline) 11 along the outer circumference thereof is pressed into the small gear RG1 and is coupled thereto integrally. On the right of the small gear RG1 in FIG. 2, a clutch hub 12 is fixed to the intermediate shaft S3 by spline-fitting, and a sliding sleeve 14 having a spline 13 to mesh with the dog teeth 11 is fitted onto the outer circumference of the clutch hub 12 so as to slide in the axial direction. Further, a synchronizer ring 15 is arranged between the dog teeth 11 and the sliding sleeve 14 to constitute a dog clutch with a synchronizer mechanism, which are usually employed by the transmissions. In this embodiment, the small gear RG1 is loosely fitted onto the intermediate shaft S3 to provide the dog clutch. It is, however, also allowable to use a large gear RG2 of the output shaft S4 as a loosely fitted gear to constitute the dog clutch.

When the sliding sleeve 14 is at a position that is shown, the dog teeth 11 are out of mesh with the spline 13 of the sliding sleeve 14, the small gear RG1 rotates idle on the intermediate shaft S3 and, therefore, the intermediate shaft S3 and the output shaft S4 are disconnected from each other. If the sliding sleeve 14 is moved leftward by a fork (not shown) that is fitted to the outer circumferential groove thereof, then the spline 13 meshes with the dog teeth 11, the small gear RG1 becomes integral with the intermediate shaft S3, and the power can be transmitted by the output shaft reduction gear train RG. The sliding sleeve 14 is prevented from moving leftward by a synchronizer ring 15 until the rotation of the intermediate shaft S3 comes into synchronism with the rotation of the small gear RG1 as is well known as the synchronizing mechanism in the transmission. The direct connection clutch C3 provided between the second input shaft S2 and the output shaft S4, too, has the same structure as the intermediate shaft connection clutch C4, and is constituted as a dog clutch to perform the same operation.

In the dual clutch transmission of this embodiment, further, the gears of the second speed gear train G2 and the fourth speed gear train G4 of even speeds are fixed to the hollow first input shaft S1. However, the gear of the sixth speed gear train is not fixed thereto unlike that of the prior art shown in FIG. 5. The gears of the first speed gear train G1 and the third speed gear train G3 of odd speeds as well as the gear train GRV which is the reverse gear are fixed to the second input shaft S2. These gears are in mesh with the corresponding gears loosely fitted to the intermediate shaft S3 to form gear trains of the respective transmission steps. The gears loosely fitted to the intermediate shaft S3 have dog teeth integrally formed therewith, and on the intermediate shaft S3 are arranged a second speed/fourth speed shifting device X1, a first speed/third speed shifting device X4, and a reverse gear connection clutch C5. The conventional dual clutch transmission of FIG. 5 is provided with three shifting devices while according to this embodiment, one shifting device is replaced by the reverse gear connection clutch C5 and, therefore, the structure of the present invention is simplified correspondingly.

The transmission step shifting device is a shifting device of the dog clutch type that is usually used in the transmission of the type of parallel shaft gear mechanism. Its structure will now be described with reference to FIG. 3 which is a view that illustrates the second speed/fourth speed shifting device X1 in detail.

A fixed gear 21 of the second speed gear train G2 and a fixed gear 41 of the fourth speed gear train G4 are formed on the hollow first input shaft S1 integrally therewith, and are in mesh with a loosely fitted gear 22 of the second speed and with a loosely fitted gear 42 of the fourth speed. These two loosely fitted gears have dog teeth 23 and 43 attached thereto integrally, and a clutch hub 24 is fixed to the intermediate shaft S3 therebetween. A speed-changing sleeve 26 having a spline 25 that meshes with the dog teeth 23 and 43 is fitted onto the outer circumference of the clutch hub 24 so as to slide in the axial direction, and synchronizer rings 27, 47 are arranged among the dog teeth 23, 43 and the speed-changing sleeve 26. This constitution is basically the same as the above-mentioned intermediate shaft connection clutch C4 and, also, disconnects the transmission of power between the first input shaft S1 and the intermediate shaft S3 by sliding the speed-changing sleeve 26, and effects the synchronizing action by the synchronizer rings at the time of connection. Here, the speed-changing sleeve 26 is capable of sliding in both the right and left directions from the neutral position that is shown to shift the transmission step. The transmission of power is interrupted if the speed-changing sleeve 26 is at the neutral position, the power is transmitted by the second speed gear train G2 if the speed-changing sleeve 26 moves toward the left, and the power is transmitted by the fourth speed gear train G4 if the speed-changing sleeve 26 moves toward the right.

Figure 4:
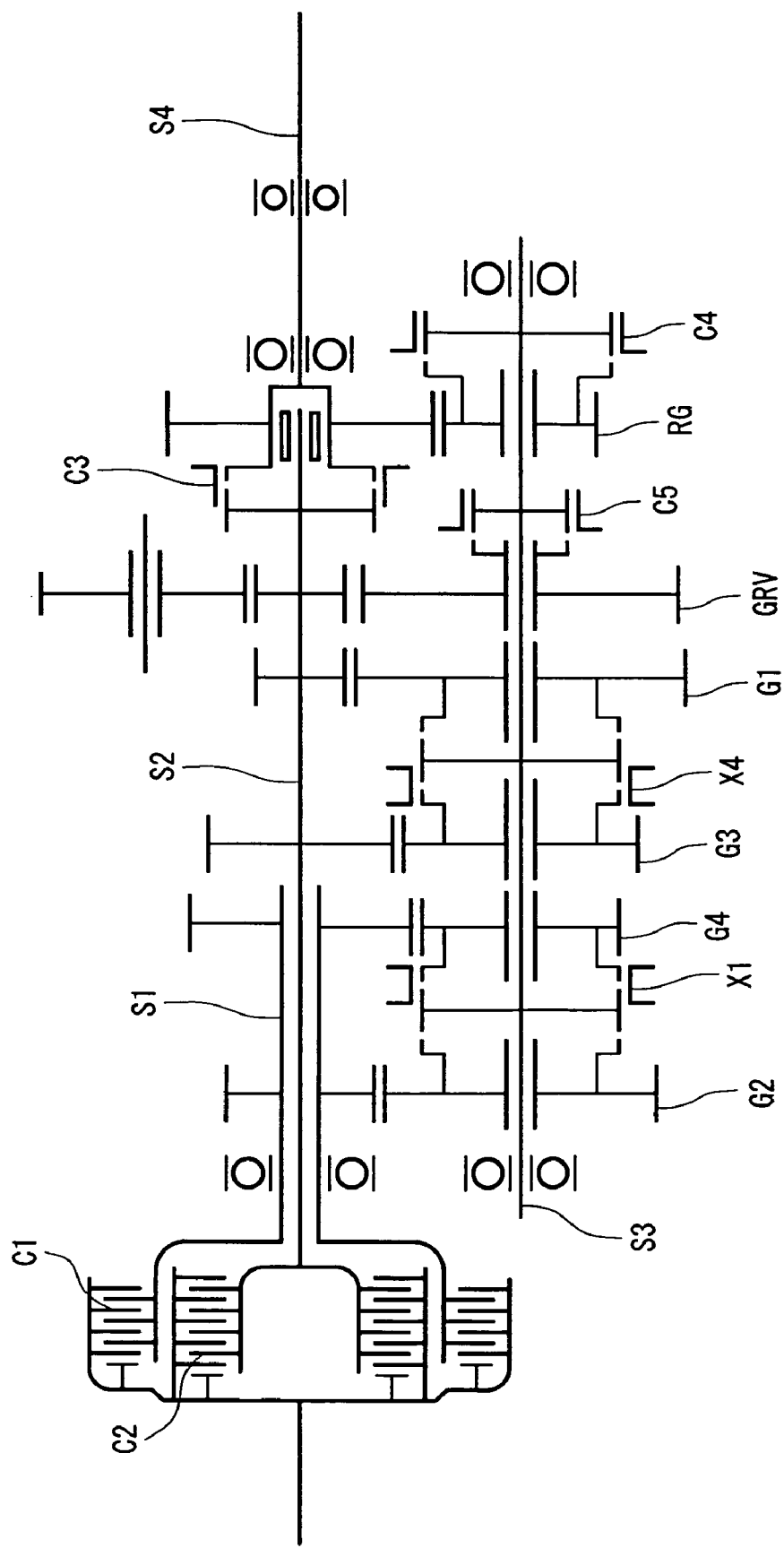
FIG. 4 is a view illustrating a state of operation at the sixth speed of the dual clutch transmission of the present invention.

Next, the operation of the dual clutch transmission of the invention will be described with reference also to FIG. 4. FIG. 4 illustrates a state of power transmission in the dual clutch transmission of the invention at the sixth speed which is the overtop gear.

When the vehicle is traveling at the first speed to fourth speed, the intermediate shaft connection clutch C4 of the output shaft reduction gear train RG is connected, and the engine power is transmitted from the output shaft reduction gear train RG to the output shaft S4 through the intermediate shaft S3. When traveling at, for example, the second speed, the first clutch C1 is connected, the second clutch C2 is disconnected, the second speed/fourth speed shifting device X1 is in mesh with the second speed gear train G2, and the engine power drives the intermediate shaft S3 from the first input shaft S1 through the second speed gear train G2 and, further, drives the output shaft S4 through the output shaft reduction gear train RG. To shift the second speed to the third speed, the first clutch C1 is disconnected, the second speed/fourth speed shifting device X1 is brought to out of mesh and is placed in the neutral state, the first speed/third speed shifting device X4 is brought in mesh with the third speed gear train G3, and the second clutch C2 is connected. The first speed/third speed shifting device X4 may be brought in mesh with the third speed gear train G3 in advance prior to disconnecting the first clutch C1. After the speed has been changed, the engine power is transmitted from the second input shaft S2 to the intermediate shaft S3 through the third speed gear train G3.

As described above, the state of the transmission at the first speed to fourth speed in which the intermediate shaft connection clutch C4 is connected and the operation at the time of changing the speed are the same as the operation of the conventional dual clutch transmission of FIG. 5. Thus, the present invention realizes the shifting of the transmission steps without substantially interrupting the transmission of the engine power and, further, achieves the effect of decreasing the load such as frictional force acting on the synchronizer mechanism.

At the fifth speed which is the direct connection gear in the dual clutch transmission of the present invention, the direct connection clutch C3 is connected and, at the same time, the intermediate shaft connection clutch C4 of the output shaft reduction gear train RG is disconnected. The engine power is transmitted from the second clutch C2 to the second input shaft S2, and is directly transmitted to the output shaft C4 through the direct connection clutch C3. When traveling at the fifth speed, the vehicle is traveling at a high speed and the output shaft S4 is rotating at a high speed correspondingly. Here, according to the present invention, the intermediate shaft connection clutch C4 is disconnected and, therefore, the intermediate shaft S3 does not rotate idle. This avoids such an occurrence in that the lubricating oil in the transmission is excessively stirred accompanying the high-speed rotation of the intermediate shaft S3, preventing a rise in the temperature of the lubricating oil and a decrease in the power transmission efficiency. This, further, avoids an increase in the noise that stems from the high-speed idle rotation of the intermediate shaft S3.

The operation at the sixth speed of the dual clutch transmission of this embodiment will be described in detail with reference to FIG. 4. At the sixth speed, the direct connection clutch C3 is connected to connect the second input shaft S2 to the output shaft S4, and the intermediate shaft connection clutch C4 is disconnected permitting the intermediate shaft S3 to rotate independently from the output shaft S4. The second speed/fourth speed shifting device X1 is brought in mesh with the fourth speed gear train G4, the first speed/third speed shifting device X4 is brought in mesh with the third speed gear train G3, and the first clutch C1 is connected while disconnecting the second clutch C2 in front of the transmission.

The engine power drives the first input shaft S1 through the first clutch C1, and drives the intermediate shaft S3 through the fourth speed gear train G4. The rotation of the intermediate shaft S3 is transmitted to the second input shaft S2 through the third speed gear train G3, and is transmitted to the output shaft S4 through the direct connection clutch C3. The reduction ratio of the third speed has been set to be greater than the reduction ratio of the fourth speed. When the rotation is transmitted through this transmission passage, therefore, the rotational speed of the second input shaft S2 becomes greater than the rotational speed of the first input shaft S1 making it possible to obtain a speed ratio of the sixth speed which is the overtop gear. The rotational speed of the intermediate shaft S3, in this case, greatly decreases as compared to the case of when driven through the gear train of the sixth speed shown in FIG. 5, contributing to suppressing excess stirring of the lubricating oil.

INDUSTRIAL APPLICABILITY

As described above in detail, the present invention is concerned with a dual clutch transmission which has two input shafts and a direct connection clutch, and transmits the power to the output shaft through the intermediate shaft, wherein provision is made of an intermediate shaft connection clutch for disconnecting the connection between the intermediate shaft and the output shaft, and the intermediate shaft is disconnected when the output shaft is to be driven by the direct connection clutch. Thus, the present invention can be utilized as a transmission in the power transmission device for a variety of kinds of vehicles.

In the transmission of the above embodiment, the output shaft is arranged at the back of the input shafts in concentric. The invention, however, can also be applied to a transmission in which the output shaft is arranged in parallel with the input shafts and the intermediate shaft. Further, the embodiment can be modified in various ways such as employing, as the intermediate shaft connection clutch, a friction clutch like wet multi-plate clutch instead of the dog clutch, or constituting the transmission steps by utilizing the intermediate shaft and the two input shafts so as to have speeds other than the six speeds.

The invention claimed is:

1. A transmission for a vehicle, said transmission comprising:
  a first input shaft connected to a first clutch and a second input shaft connected to a second clutch, said first clutch and said second clutch being connected to an engine, respectively;
  an intermediate shaft arranged in parallel with said first input shaft and said second input shaft;
  an output shaft which outputs a power from said transmission;
  a plurality of gear trains for constituting transmission gear ratios provided between said first input shaft and said intermediate shaft, and also between said second input shaft and said intermediate shaft, the gear trains being provided on said first input shaft and on said second input shaft constituting every other transmission gear ratios;
  an output shaft reduction gear train provided between said intermediate shaft and said output shaft, said output shaft reduction gear train being disposed at an end of said intermediate shaft and transmitting a power from said intermediate shaft to said output shaft at a reduced rotational speed;
  a direct connection clutch provided between said second input shaft and said output shaft; and
  an intermediate shaft connection clutch provided on said output shaft reduction gear train,
  wherein said direct connection clutch is connected and said intermediate shaft connection clutch is disconnected when a power of said engine is transmitted directly to said output shaft at a same rotational speed as said engine, such that said intermediate shaft stops rotating when the power of said engine is transmitted directly to said output shaft, and
  wherein said direct connection clutch is connected and said intermediate shaft connection clutch is disconnected for constituting one of said transmission gear ratios in which said output shaft rotates at a speed exceeding said engine, such that the power of said engine is transmitted to said output shaft through said first input shaft, said intermediate shaft rotating at a lower speed than said output shaft, and said second input shaft.

2. The transmission according to claim 1, wherein said intermediate connection clutch comprises a dog clutch provided with a synchronizer mechanism.

3. The transmission according to claim 2, wherein said first input shaft is hollow, said second input shaft extends passing through a hollow portion of said first input shaft, and said output shaft is arranged in concentric with said first input shaft and said second input shaft.

4. The transmission according to claim 1. wherein said first input shaft is hollow, said second input shaft extends passing through a hollow portion of said first input shaft, and said output shaft is arranged in concentric with said first input shaft and said second input shaft.

5. The transmission according to claim 4 wherein the second clutch has a circular shape and the first clutch is constructed in a circular shape arranged concentrically along an outer circumferential portion of the second clutch.

6. The transmission according to claim 1, wherein disconnecting said intermediate shaft connection clutch stops a rotation of said intermediate shaft.

7. The transmission according to claim 1, wherein said intermediate shaft connection clutch is located between said intermediate shaft and said output shaft.

8. The transmission according to claim 7, wherein disconnecting said intermediate shaft connection clutch stops a rotation of said intermediate shaft.

* * * * *